US009959049B1

(12) United States Patent
Armangau

(10) Patent No.: US 9,959,049 B1
(45) Date of Patent: May 1, 2018

(54) AGGREGATED BACKGROUND PROCESSING IN A DATA STORAGE SYSTEM TO IMPROVE SYSTEM RESOURCE UTILIZATION

(71) Applicant: EMC IP Holding Company LLC, Hopkinton, MA (US)

(72) Inventor: Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 8 days.

(21) Appl. No.: 15/280,284

(22) Filed: Sep. 29, 2016

(51) Int. Cl.
*G06F 3/06* (2006.01)
*G06F 12/10* (2016.01)

(52) U.S. Cl.
CPC .......... *G06F 3/0608* (2013.01); *G06F 3/064* (2013.01); *G06F 3/067* (2013.01); *G06F 3/0646* (2013.01); *G06F 3/0652* (2013.01); *G06F 3/0653* (2013.01); *G06F 3/0673* (2013.01); *G06F 3/0689* (2013.01); *G06F 12/10* (2013.01); *G06F 2212/1044* (2013.01)

(58) Field of Classification Search
CPC ...... G06F 3/0608; G06F 3/064; G06F 3/0646; G06F 3/0653; G06F 3/0673; G06F 3/061; G06F 3/0611; G06F 3/0613; G06F 3/0623; G06F 3/062; G06F 3/0641; G06F 3/0638; G06F 3/0643; G06F 3/0644; G06F 3/0652; G06F 3/067; G06F 3/0683; G06F 3/0689; G06F 12/10; G06F 2212/1044

See application file for complete search history.

(56) References Cited

U.S. PATENT DOCUMENTS

| 6,735,693 | B1 | 5/2004 | Hamlin |
| 8,239,691 | B2 | 8/2012 | Watanabe et al. |
| 8,429,499 | B2 | 4/2013 | Akiyama et al. |
| 2010/0005265 | A1* | 1/2010 | Odaira ............... G06F 12/0276 711/163 |
| 2010/0064166 | A1* | 3/2010 | Dubnicki .......... G06F 17/30067 714/4.1 |

(Continued)

OTHER PUBLICATIONS

"EMC Symmetrix VMAX Virtual Provisioning Space Reclamation and Application Considerations," Abstract, EMC Corporation, Nov. 2013, pp. 1-41.

(Continued)

*Primary Examiner* — Michael Krofcheck
(74) *Attorney, Agent, or Firm* — BainwoodHuang

(57) ABSTRACT

Techniques for aggregating background processing in a data storage system. Blocks are identified having contents on which a data operation was not performed in-line. The background data operation is prevented for blocks that will no longer be accessed by the host computer because they are only mapped to files implementing data objects that are scheduled for future deletion. A region of blocks may be selected that meets a criteria for performing a background free space operation, and the background data operation may be performed on the contents of blocks in the selected region while the contents of those blocks are being relocated to other blocks while performing the background free space operation. While performing the background data operation, blocks may be freed from files that implement data objects scheduled for future deletion.

19 Claims, 8 Drawing Sheets

(56) References Cited

U.S. PATENT DOCUMENTS

2013/0036278 A1* 2/2013 Strzelczak .............. G06F 11/14
                                                711/161
2014/0179272 A1* 6/2014 Zhang ................... H04W 4/001
                                                455/411

OTHER PUBLICATIONS

"EMC VNX Snapshots," Abstract, EMC Corporation, Mar. 2015, pp. 1-58.
Danseglio, Mike, "The Shortcut Guide to Managing Disk Fragmentation," Realtime Nexus, 2007, Article accessed Nov. 17, 2016 <<http://www.realtimepublishers.com/chapters/1194/SGMDF-2.pdf>>.
Reghbati, H.K., "An Overview of Data Compression Techniques," IEEE, Apr. 1981, pp. 71-75.
Welch, Terry A., "A Technique for High-Performance Data Compression," IEEE, Jun. 1984, pp. 8-19.

* cited by examiner

AGGREGATED BACKGROUND PROCESSING IN A DATA STORAGE SYSTEM TO IMPROVE SYSTEM RESOURCE UTILIZATION

BACKGROUND

Data storage systems are arrangements of hardware and software that typically include multiple storage processors coupled to arrays of non-volatile storage devices, such as magnetic disk drives, electronic flash drives, and/or optical drives, for example. The storage processors service storage requests that arrive from host computers and that specify files or other data elements to be written, read, created, or deleted, for example. The storage processors run software that manages incoming storage requests and performs various data processing tasks to organize and secure data stored on the non-volatile storage devices.

Previous data storage systems have used background processing to perform specific data services. For example, some previous data storage systems have opportunistically performed certain data services "in-line", i.e. on data specified by I/O write requests received by the data storage system, prior to sending the data to an internal file system within the data storage system (referred to herein as a "lower-deck" file system), from which the data is passed to the non-volatile storage devices. Data services that previous systems have attempted to perform "in-line" have included data deduplication, compression, and/or encryption. Previous systems have performed these services "in-line" opportunistically, in consideration of the current load experienced by the data storage system, such that the data services are performed only when sufficient operational resources of the data storage system (e.g. storage processor CPU, storage processor I/O resources, etc.) are available for the data services to be performed without adversely impacting the overall performance of the data storage system. At other times, when the current load results in insufficient resources being available for these data services to be performed in-line, some data specified by I/O write requests has been sent to the lower-deck file system without data deduplication, compression and/or encryption. Background processing may then be used to perform data deduplication, compression and/or encryption on data after the data was sent to the lower-deck file system.

SUMMARY

Unfortunately, previous approaches used by data storage systems to perform background processing with regard to data services such as data deduplication, data compression and/or data encryption have exhibited significant shortcomings. In some previous data storage systems, individual background processes have been dedicated to independently performing individual data services. Accordingly, background processing for data deduplication and/or compression was performed independently from other background processing, as was background processing for encryption, and so on. As a result, some background data operations were performed unnecessarily, and some data was accessed repeatedly by different background operations, adversely affecting the performance of the data storage system. For example, in previous approaches, background data operations were performed on data blocks of the lower-deck file system even when those data blocks were only used to store data for data objects that were scheduled to be subsequently deleted, e.g. by another background process. Performing background data operations on such data blocks is unnecessary, and a waste of operational resources of the data storage system. In another example, data blocks of the lower deck file system were accessed repeatedly because background data operations were performed independently from background free space operations, such as free space defragmentation and/or space reclamation. Performing such repeated data accesses, potentially on data that must be retrieved from the non-volatile storage devices of the data storage system, further consumed significant amounts of operational resources of the data storage system.

To address the above and other shortcomings of previous approaches, new techniques are disclosed herein for aggregating background processing in a data storage system. In the disclosed techniques, an internal file system of the data storage system contains files that implement corresponding data objects that are available to host computers, and also maps the files to blocks provided within an address space of the file system. Regions of the blocks in the file system address space correspond to units of non-volatile storage provisioned from a set of storage devices of the data storage system that provide storage for the file system, and that are used to store data from corresponding blocks. The disclosed techniques include identifying blocks within the file system address space that have contents on which a background data operation has not previously been performed (e.g. was not performed in-line). For example, as part of performing a background data operation of data deduplication, blocks may be identified that have contents on which data deduplication has not been performed. In another example, as part of performing a background data operation of data compression, blocks may be identified that have contents on which data compression has not been performed. And similarly, as part of performing a background data operation of data encryption, blocks may be identified that have contents on which data encryption has not been performed.

While performing the background data operation on the contents of blocks having contents on which the background data operation has not been performed, the disclosed techniques include identifying blocks having contents on which the background data operation has not been performed, but that will no longer be accessed by the host computer. For example, the disclosed techniques may include finding a version family of a data object, containing one or more data objects implemented by files that may be mapped to a block that has contents on which the background data operation has not been performed, and preventing the background data operation from being performed on the block if all the files that are currently mapped to the block implement data objects that are scheduled for future deletion.

In another aspect of the disclosed techniques, a region of blocks may be selected within the file system address space that meets a criteria for performing a background free space operation, such as free space defragmentation or free space reclamation. Blocks may then be identified from within the selected region that have contents on which the background data operation has not previously been performed. The background data operation may then be performed on the contents of blocks identified within the selected region as having contents on which the background data operation has not been performed while the contents of the blocks is being relocated to other blocks within the file system address space (e.g. outside the selected region) as part of performing the background free space operation. In this way the contents of the blocks need only be retrieved (e.g. from non-volatile storage) once in order to perform both the background data operation and the background free space operation, thus advantageously reducing operational resource consumption within the data storage system.

In one example, a region may meet the criteria for performing the background free space operation if the region has less than a threshold percentage of allocated blocks within it, and selecting the region may consist of selecting a region of blocks in the address space having less than the threshold percentage of allocated blocks, and that also corresponds to a slice of disk storage provisioned from the set of storage devices to store data from the blocks in the region.

In another aspect of the disclosed techniques, performing the data operation on the contents of blocks identified as having contents on which the background data operation has not been performed may include, for each block identified within the address space as having contents on which the background data operation has not been performed, finding the set of one or more files that are currently mapped to the block, determining that one of the files mapped to the block implements a data object that is scheduled for future deletion, and freeing the block from that file, such that the file is no longer mapped to the block. In this way, a separate background process that is responsible for deleting data objects scheduled for future deletion will not be required to free the block from the file when deletion of the data object is subsequently completed, since the block will already have been freed from the file that implements the data object.

The disclosed system may be embodied to provide significant advantages over previous technologies. For example, the disclosed techniques may be embodied such that unnecessary background data operations are avoided, and such that data accesses are shared by different background operations. In this way, utilization of data storage system operational resources (e.g. storage processor CPU, storage processor I/O resources, etc.) may be improved, thus improving the performance of the data storage system.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided by way of example to illustrate various features and principles of the invention, and that the invention hereof is broader than the specific example embodiments disclosed.

The techniques for aggregating background processing performed in a data storage system disclosed herein include providing blocks within an address space of a lower-deck file system that is internal to the data storage system, where the file system maps files in the file system to the blocks in the address space, and where each file implements a corresponding data object that is accessible to at least one host computer. The contents of the blocks in the address space are stored to non-volatile storage in a set of storage devices that provide non-volatile storage for the file system.

As disclosed herein, a region of blocks within the address space may be selected that meets criteria for performing a background free space operation. Blocks are identified within the region that have contents on which a background data operation has not previously been performed, e.g. has not previously been performed in-line. The disclosed techniques further include, while performing the background data operation on the contents of the blocks that were identified as having contents on which the background data operation has not previously been performed, i) identifying blocks that will no longer be accessed by the host computer, ii) preventing the background data operation from being performed on blocks that will no longer be accessed by the host computer, iii) performing the background data operation on the contents of blocks on which the background data operation has not previously been performed while the contents of those blocks are being relocated to other blocks to perform the background free space operation, and iv) freeing blocks from files that implement data objects that are scheduled for future deletion while performing the background data operation.

As further described below, examples of background data operations include data deduplication, data compression, and/or data encryption, and examples of background free space operations include free space defragmentation and free space reclamation. Examples of data objects include logical disks commonly referred to as LUNs, host file systems, virtual machine disks commonly referred as virtual volumes or VVols, snapshot data objects that are point-in-time copies of other data objects, and/or other types of data objects, which the data storage system makes accessible to the host computers for reading and/or writing.

Figure 1:
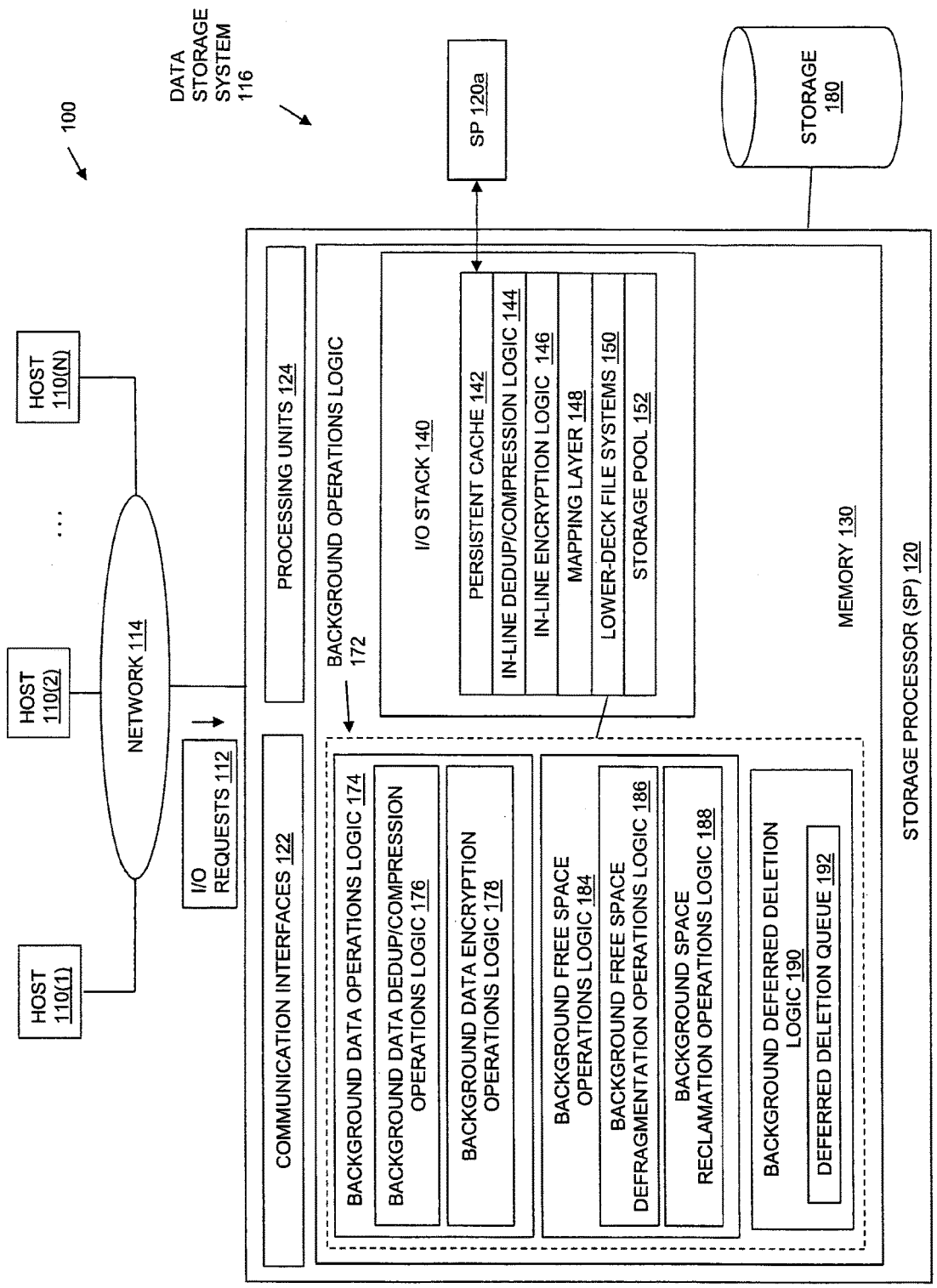
FIG. 1 is a block diagram showing an example of components in an operational environment including an embodiment of the disclosed techniques.

FIG. 1 shows an example of an environment 100 in which embodiments of the techniques disclosed herein can be practiced, including an illustrative embodiment of the disclosed techniques for aggregating background processing performed in a data storage system. As shown in FIG. 1, multiple host computing devices ("Hosts"), shown as devices 110(1) through 110(N), and/or host applications executing in whole or in part on devices 110(1) through 110(N), access a Data Storage System 116 over a Network 114. The Data Storage System 116 includes a storage processor, or "SP," 120 and Storage 180. The Data Storage System 116 may include multiple SPs like the SP 120 (e.g., a second SP, 120a). In one example, multiple SPs are be provided as circuit board assemblies, or "blades," which plug into a chassis that encloses and cools the SPs. The chassis may have a backplane for interconnecting the SPs, and additional connections may be made among SPs using cables. Those skilled in the art will recognize, however, that no particular hardware configuration is required, as any number of SPs, including a single SP, may be provided and that SP 120 can be any type of computing device capable of processing host I/O requests.

Storage 180 may take the form of RAID groups, where each RAID group is composed of multiple disk drives. The disk drives may include magnetic disk drives, electronic flash drives, optical drives, and/or other types of drives. In a typical example, each RAID group includes disk drives of a common type that provide similar performance. It should be understood, though, that there is no requirement for Storage 180 to be organized in RAID groups.

Network 114 can be any type of network or combination of networks, such as, for example, a storage area network (SAN), a local area network (LAN), a wide area network (WAN), the Internet, and/or some other type of network or combination of networks. The Hosts 110(1-N), and/or host applications executing in whole or in part on Hosts 110(1-N), may connect to the SP 120 using various technologies, such as, for example, Fibre Channel, iSCSI, NFS, SMB 3.0, and CIFS. Any number of Hosts 110(1-N) and/or host applications executing in whole or in part on Hosts 110(1-N) may be provided, using any of the above protocols, some subset thereof, or other protocols besides those listed. As is known, Fibre Channel and iSCSI are block-based protocols, whereas NFS, SMB 3.0, and CIFS are file-based protocols. SP 120 may be configured to receive I/O requests 112 according to both block-based and file-based protocols and to respond to such I/O requests 112 by reading or writing the Storage 180.

SP 120 may include one or more Communication Interfaces 122, a set of Processing Units 124, and Memory 130. Communication Interfaces 122 may include, for example, SCSI target adapters and network interface adapters for converting electronic and/or optical signals received over Network 114 into electronic form for use by SP 120. The set of Processing Units 124 may include one or more processing chips and/or assemblies. In a particular example, the Processing Units 124 includes numerous multi-core CPUs. Memory 130 may include both volatile memory (e.g., RAM), and non-volatile memory, such as one or more ROMs, disk drives, solid state drives, and the like. Processing Units 124 and Memory 130 together form control circuitry, which is constructed and arranged to carry out various methods and functions as described herein. Also, Memory 130 includes a variety of software constructs provided in the form of executable instructions. When the executable instructions are executed by Processing Units 124, Processing Units 124 are caused to carry out the operations of the software constructs. Although certain software constructs are specifically shown and described, those skilled in the art will recognize that Memory 130 may further include various other software constructs, which are not shown, such as an operating system, various applications, processes, and daemons.

As further shown in FIG. 1, Memory 130 may include (i.e., provide by operation of programming code) an I/O stack 140, and Background Operations Logic 172. The I/O Stack 140 provides an execution path for host I/Os requests, e.g. I/O Requests 112.

The I/O Stack 140 is seen to include, for example, a Persistent Cache 142, In-Line Dedup/Compression Logic 144, In-Line Encryption Logic 146, Mapping Layer 148, Lower-Deck File Systems 150, and Storage Pool 152. The Lower-Deck File Systems 150 store files that are used to implement multiple data objects. For example, multiple data objects may be implemented in corresponding files stored in Lower-Deck File Systems 150. Each one of the data objects implemented by a respective file stored in one of the Lower-Deck File Systems 150 may, for example, take the form of a logical disk referred to as a LUN (Logical Unit Number) logical disk, a host file system, a VVol (virtual volume, for example a virtual machine disk, e.g., as available from VMware, Inc. of Palo Alto, Calif.), a snapshot data object that is a point-in-time copy of another data object, or some other type of data object.

Mapping Layer 148 converts I/O requests directed to each one of the data objects into corresponding reads and writes of the corresponding one of the files stored in Lower-Deck File Systems 150 that implements the data object. For example, each one of the files stored in Lower-Deck File Systems 150 may have a logical address space and a set of associated addresses in an address space of the file system that contains it. The logical address space for a file may, for example, be a monotonic range of logical offsets into the file, e.g., as tracked by a mapping structure of the file. The mapping structure for a file may consist of, include or be part of an "inode" data structure, and may also be stored in the one of the Lower-Deck File Systems 150 that stores the file. The set of file system address space addresses associated with a file identify the blocks used by the lower-deck file system that contains the file to store the data of the file. For purposes of explanation herein, the size of each "block" is the size of the smallest allocatable unit of storage, such as 8 KB, for example.

For example, Persistent Cache 142 may be implemented in DRAM (Dynamic Random Access Memory). The DRAM may be mirrored to DRAM on at least one other SP (e.g., on SP 120a), and the DRAM on both SPs may be backed up by battery. The contents of Persistent Cache 142 may thus persist on at least two SPs, even in the event of a power loss. The Persistent Cache 142 may thus provide the speed characteristics of DRAM while also providing persistence not normally found with DRAM.

In an example of operation, Hosts 110(1-N), and/or host applications executing on Hosts 110(1-N), issue I/O Requests 112 to the Data Storage System 116. The SP 120 receives I/O Requests 112 at Communication Interfaces 122, and passes the I/O requests to the I/O Stack 140 for further processing. The I/O Requests 112 include write requests. Each write request may specify a data object, and specify (e.g. include) data to be written to the data object. For each one of the write requests received by Storage Processor 120, the specified data is stored in Persistent Cache 142. The Storage Processor 120 may also provide an acknowledgment to the host that issued the write request once the data specified by the write request has been securely stored in Persistent Cache 142 (e.g., saved to battery-backed DRAM on the SP 120 and successfully mirrored to battery-backed DRAM on SP 120a). Such an acknowledgement indicates successful completion of the write request. The above process may be repeated for additional write requests specifying additional data to be written to various locations of the same data object. Persistent Cache 142 accumulates the data specified in these requests, e.g., in the order received, and provides an acknowledgement in response to each one. In this way, data specified by one or more write requests directed to the same data object may be accumulated in Persistent Cache 142. In some embodiments, the data storage system may be configured to run host applications locally, i.e., in the Memory 130 of the SP 120. In these arrangements, I/O Requests 112 may arise internally, i.e., from the locally running applications, rather than being received from an external host.

Each write request specifies not only the data to be written but also the location at which the specified data is to be written relative to the specified data object. For example, if the specified data object is a LUN, the write request may specify the location of the data within the LUN as an offset into the LUN. If the data object is a host file system, the write request may specify the location of the data by file name and an offset into the named file. Mapping Layer 148 maps the specified data object to a respective file used to implement the data object, and also maps the various data location indicators to a set of logical offsets within that file. The lower-deck file system (e.g. one of lower-deck file systems 150) that stores the file further maps these logical offsets to addresses of blocks of storage. In some cases, the data to be written is directed to blocks that have already been allocated and mapped by the file system that stores the container file, such that the data writes prescribe overwrites of existing blocks. In other cases, the data to be written is directed to locations that do not yet have any associated physical storage, such that the file system must allocate new blocks to the container file to store the data.

At some point in the course of accumulating data specified by one or more write requests in Persistent Cache 142, the In-Line Dedup/Compression Logic 144 performs data deduplication and data compression on the accumulated data contained in persistent cache 142, or on portions thereof. The specific type of data deduplication performed using the disclosed techniques may be any type of data duplication that involves eliminating duplicate copies of repeating data, and is used to improve storage utilization. Accordingly, data deduplication in the disclosed system may generally be accomplished by comparing chunks of data (e.g. blocks) to detect duplicates. For example, as it is generally known, in order to facilitate the comparison process, each chunk of data may be assigned an identification, calculated by the software, typically using a cryptographic hash function (e.g. secure hash algorithm SHA-1 or the like). If a given identification already exists, then the duplicate chunk may be replaced with a small link to a stored copy of the corresponding data, thus reducing storage requirements. In some cases, an additional verification may be performed to ensure that data with the same identification is identical prior replacement of a chunk with a pointer. After data deduplication has been performed, when the deduplicated data is read back, wherever a link is found within the deduplicated data, the link is simply replaced with the stored copy of duplicate data.

The specific type of data compression performed using the disclosed techniques may be any type of lossless compression that identifies and eliminates statistical redundancy or redundancies in the data, in such a way that the resulting compressed data may be decompressed without any loss of information.

In-Line Encryption Logic 146 performs in-line encryption of the data accumulated in persistent cache 142. Encryption performed using the disclosed techniques may be data object specific. In other words, the specific encryption performed may be different for each data object, e.g. use different encryption keys for different data objects. The specific type of encryption performed using the disclosed techniques may, for example, consist of or include symmetric-key encryption, in which the same key may be used for both encryption and decryption, and/or asymmetric-key encryption, in which different keys are used for encryption and decryption.

For example, In-Line Encryption Logic 146 may operate to encrypt the resulting deduplicated and compressed data after the data accumulated in Persistent Cache 142 has been deduplicated and compressed. The encryption performed by the disclosed techniques may be performed on a block-by-block basis (per block), e.g. on individual blocks of deduplicated and compressed data.

At some point in the course of accumulating data specified by one or more write requests, the Persistent Cache 142 performs a flushing operation to send the accumulated data, or portions thereof, to the Lower-Deck File Systems 150 for organizing and incorporating the data into the Storage 180.

However, the in-line data deduplication and compression performed by In-Line Dedup/Compression Logic 144, and the in-line data encryption performed by In-Line Encryption Logic 146, is only performed opportunistically, in consideration of the current load experienced by Data Storage System 116, such that in-line data deduplication, compression, and/or encryption are performed only when a sufficiently large amount of the operational resources within the Data Storage System 116 (e.g. Processing Units 124, Communication Interfaces 122, etc.) are available for performing in-line data deduplication, compression, and/or encryption, without adversely impacting the overall performance of the Data Storage System 116. At other times, when the current load results in insufficient operational resources being available for these data operations to be performed in-line, some data specified by I/O write requests in I/O Requests 112 will be flushed from Persistent Cache 142 into Lower-Deck File Systems 150 without data deduplication, compression and/or encryption having been performed in-line within I/O Stack 140. To accommodate this situation, one or more background processes are provided outside of and executing independently from I/O Stack 140, e.g. as shown in Background Operations Logic 172. Background Operations Logic 172 may include program code for performing background data operations on data stored in Lower-Deck File Systems 150, e.g. by execution of Background Data Operations Logic 174, which includes Background Data Dedup/Compression Operations Logic 176 for performing background data deduplication and/or background compression operations, and Background Data Encryption Operation Logic 178 for performing background data encryption operations.

Background Operations Logic 172 may further include program code for performing background free space operations on Lower-Deck File Systems 150, such as background free space defragmentation operations and/or background space reclamation operations, e.g. by execution of Background Free Space Operations Logic 184, which includes Background Free Space Defragmentation Operations Logic 186 for performing background free space defragmentation operations, and Background Space Reclamation Operations Logic 188 for performing background space reclamation operations. Free space defragmentation operations performed by the disclosed techniques may include any specific technique for defragmenting the free space that is available to be provisioned from Storage 180 to store data of Lower-Deck File Systems 150, by reducing the amount of fragmentation of such free space. Such free space defragmentation operations may accordingly include moving stored data (e.g. reading the contents of one or more specific blocks and writing the contents to other block locations) in order to create larger numbers of larger regions (e.g. slices) of free space within Storage 180 for use by Lower-Deck File Systems 150.

Space reclamation operations performed by the disclosed techniques may include any specific technique for space reclamation that increases the free space that is available to be provisioned from Storage 180 to store data of Lower-Deck File Systems 150, for example by reclaiming all-zero space and previously used non-zero space in Storage 180, in order to increase the amount of free space in Storage 180 that is available for use by Lower-Deck File Systems 150. Some space reclamation operations may include reading and writing the contents of one or more blocks in order to create larger amounts of free space within Storage 180.

Background free space defragmentation operations and/or background space reclamation operations may, for example, be performed periodically, e.g. once a week, once a day, once an hour, or at some other periodicity, and/or in response to initiation by a system administration user.

Background Operations Logic 172 may further include program code for performing deferred deletion operations on data objects that have been scheduled for deletion by having previously been queued to Deferred Deletion Queue 192, e.g. by execution of Background Deferred Deletion Logic 190. For example, deletion of a snapshot data object may be requested in response to various specific events, e.g. in response to a delete command being received from a system administration user, in response to a predetermined time period passing since the snapshot was created, in response to a threshold number of snapshot data objects being created that are all copies of the same data object, etc. However, actually deleting a snapshot data object may be a resource intensive operation, and it may be desirable from a system performance standpoint to defer deletion of the snapshot at the time an event occurs that causes deletion of the snapshot data object to be requested. For example, if an event occurs that triggers a request to delete a snapshot at a time at which the Data Storage System 116 is experiencing a high load (e.g. in terms of number of I/O Requests 112), it may be desirable to defer the actual deletion of the snapshot data object until a later time at which the Data Storage System 116 is not so highly loaded. Accordingly, under such circumstances, the snapshot data object to be deleted (e.g. and/or the corresponding file realizing the snapshot data object in Lower-Deck File Systems 150) may be enqueued to Deferred Deletion Queue 192. After a snapshot data object is enqueued to Deferred Deletion Queue 192, it is scheduled for future deletion, and it is considered to be deleted by the Hosts 110(1) through 110(N), and so will accordingly no longer be accessed by Hosts 110(1) through 110(N). However, the snapshot data object, including the file and/or related structures implementing the snapshot data object in Lower-Deck File Systems 150, will not actually be deleted until Background Deferred Deletion Logic 190 determines that the current load on Data Storage System 116 is sufficiently low that deleting the snapshot data object can be performed without adversely affecting the overall performance of Data Storage System 116. Background Deferred Deletion Logic 190 then dequeues the snapshot data object from the Deferred Deletion Queue 192, and completely deletes the snapshot data object and the file and/or related structures implementing the snapshot data object.

Figure 2:
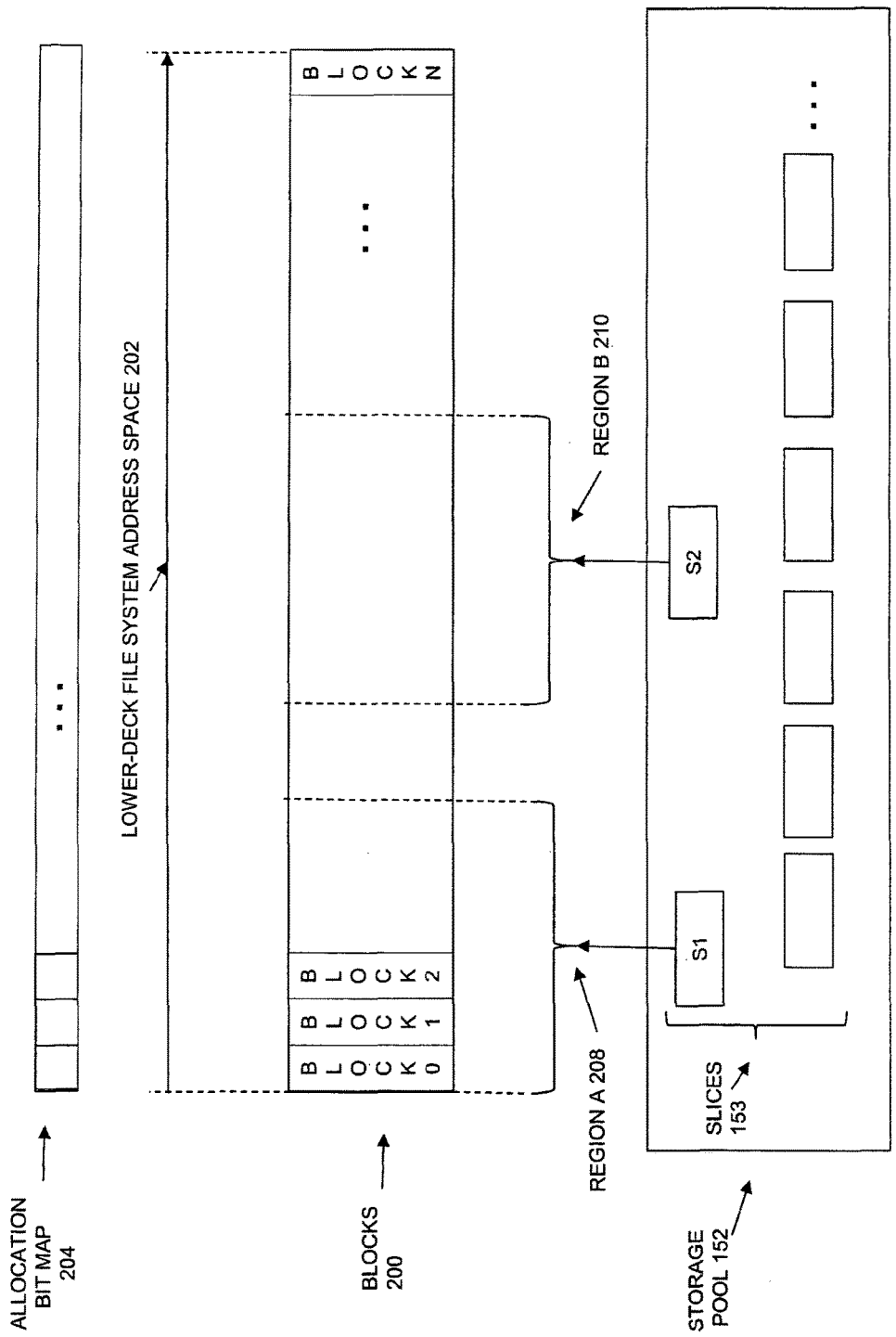
FIG. 2 is a block diagram showing an example of providing blocks within an address space of a lower-deck file system, and showing regions of blocks within the address space of the file system, each of the regions corresponding to a slice of storage provisioned from a non-volatile storage device to store the contents of the blocks in the respective region.

FIG. 2 is a block diagram showing an example of providing blocks within an address space of a file system in Lower-Deck File Systems 150, and showing examples of regions of blocks within the address space of the file system, each of the regions corresponding to a slice of storage provisioned from a non-volatile storage device to store the contents of the blocks the respective region. In the example of FIG. 2, Blocks 200 (e.g. Block 0 through Block N) are provided within a File System Address Space 202 of one of the file systems in Lower-Deck File Systems 150. An Allocation Bit Map 204 is a bit map that includes a bit for each corresponding one of the blocks in Blocks 200. If a given bit in Allocation Bit Map 204 is set, then at least one file in the file system is mapped to the corresponding block. If a given bit in Allocation Bit Map 204 is clear, then no files in the file system are mapped to the corresponding block, and the corresponding block is accordingly available for allocation.

The file system organizes units of non-volatile storage (e.g. slices of disk storage) that are allocated from Storage 180 to the file system through the shared Storage Pool 152, e.g. using a storage pool manager process or the like executing on Storage Processor 120. Similarly, the file system may operate to return units of non-volatile storage to the shared Storage Pool 152 when such non-volatile storage is no longer needed. The Storage Pool 152 organizes elements of the Storage 180 into Slices 153. A "slice" is an example of a unit of storage space (e.g. 256 megabytes or 1 gigabytes in size), which is derived from Storage 180. In the example of FIG. 2, the slice 51 has been allocated from Storage Pool 152 to provide non-volatile storage for the contents of the blocks located within Region A 208 of the File System Address Space 202, and the slice S2 has been allocated from Storage Pool 152 to provide non-volatile storage for the contents of the blocks located within Region B 210.

In some embodiments of the disclosed techniques, Background Data Operations Logic 174 (e.g. Background Data Dedup/Compression Operations Logic 176 and/or Background Data Encryption Operation Logic 178) may select a region of blocks (e.g. Region A 208 or Region B 210) within File System Address Space 202 that meets a criteria for performing a background free space operation, such as a free space defragmentation operation performed by Background Free Space Defragmentation Operations Logic 186, or a space reclamation operation performed by Background Space Reclamation Operations Logic 188. Blocks may then be identified from within the selected region that have contents on which a background data operation has not previously been performed, e.g. blocks on which data deduplication, data compression, and/or data compression has not previously been performed. One or more background data operations may then be performed on the contents of blocks identified within the selected region as having contents on which the background data operation has not been performed, at the same time the contents of the blocks is being processed to accomplish a background free space operation, e.g. while the contents of the blocks are being relocated to other blocks within the address space (e.g. outside the selected region) as part of performing a background free space operation, in order to free the selected region for subsequent reallocation. In this way the contents of the blocks on which the background data operation is performed need only be retrieved (e.g. read from Storage 180) once in order to perform both the background data operation and the background free space operation, thus reducing operational resource consumption within the Data Storage System 116, such as consumption of I/O resources required to access Storage 180, and/or consumption of processing resources in Processing Units 124, resulting in improved resource utilization and overall system performance of Data Storage System 116.

In one example, a region of blocks may meet the criteria for performing a background free space operation if the region has less than a pre-set or configured threshold percentage of allocated blocks within it, based on an inspection of the values of corresponding bits in Allocation Bit Map 204, e.g. less than twenty percent of the blocks with the region are allocated, less than ten percent of the blocks within the region are allocated, etc. Selecting a region for performing a background data operation, e.g. by Background Data Dedup/Compression Operations Logic 176 and/or Background Data Encryption Operation Logic 178 may consist of or include selecting a region of blocks in the File System Address Space 202 that has less than the threshold percentage of allocated blocks, and that corresponds to a slice of non-volatile (e.g. disk) storage provisioned from the Storage 180 (e.g. allocated from Storage Pool 152) to store contents of the blocks located within that region of the File System Address Space 202.

Figure 3:
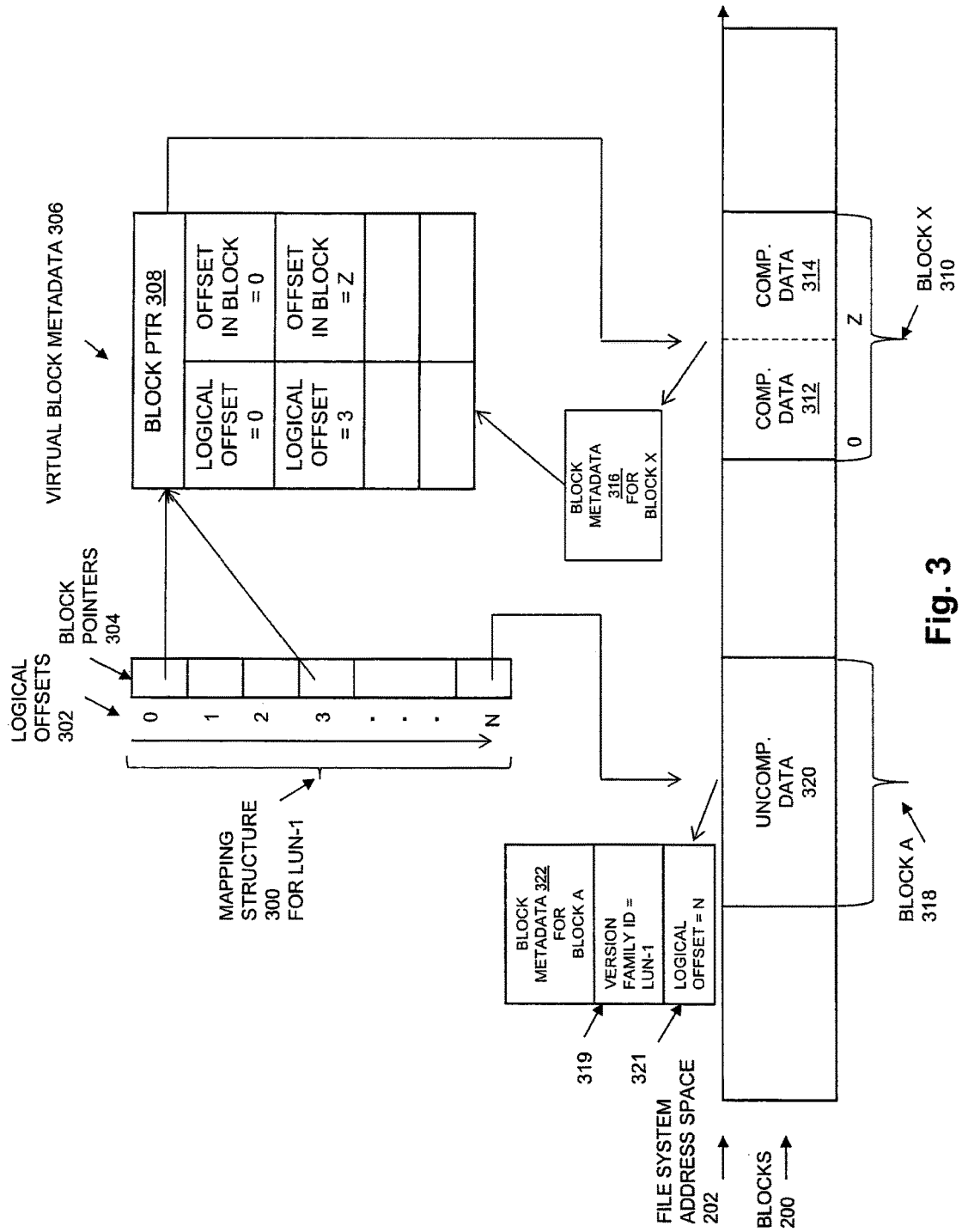
FIG. 3 is a block diagram showing an example of a block within the file system address space having contents on which a background data operation has not previously been performed, and an example of a block within the file system address space having contents on which a background data operation has previously been performed (e.g. by in-line logic)

FIG. 3 is a block diagram showing an example of a block within the file system address space having contents on which a background data operation has not previously been performed, and an example of a block within the file system address space having contents on which a background data operation has previously been performed (e.g. by in-line logic). As shown in FIG. 3, a Mapping Structure 300 (e.g. within an inode structure) for a file that implements a LUN data object LUN-1 may be indexed using Logical Offsets 302 in order to access the contents of LUN-1. Each one of Logical Offsets 302 corresponds to one of Block Pointers 304. Each one of Block Pointers 304 maps the file that implements LUN-1 to the block that stores the data for the portion of LUN-1 corresponding to that one of the Logical Offsets 302. Accordingly, a pointer in Block Pointers 304 corresponding to logical offset zero maps the file that implements LUN-1 to the block that stores the data for the portion of LUN-1 corresponding to logical offset zero, a pointer in Block Pointers 304 corresponding to logical offset one maps the file that implements LUN-1 to the block that stores the data for the portion of LUN-1 corresponding to logical offset one, and so on.

Block X 310 is an example of a block that has a contents on which data compression has previously been performed. For example, data compression (and/or data deduplication) was previously performed by In-Line Dedup/Compression Logic 144 on the portions of LUN-1 that correspond to logical offsets one and three, and the resulting compressed data was stored into Block X 310. In order to correctly map the file implementing LUN-1 to the compressed data now located in Block X 310, In-Line Dedup/Compression Logic 144 created and/or accessed Virtual Block Metadata 306, and loaded pointers to Virtual Block Metadata 306 into the block pointers in Block Pointers 304 that correspond to logical offsets one and three. Virtual Block Metadata 306 includes a mapping from logical offset zero to an offset of zero (0) in Block X 310, indicating that the Compressed Data 312 for the portion of LUN-1 corresponding to offset zero begins at offset zero in Block X 310. Virtual Block Metadata 306 further includes a mapping between logical offset three (3) and an offset of Z in Block X, indicating that the Compressed Data 314 for the portion of LUN-1 corresponding to logical offset three begins at an offset Z in Block X 310. The In-Line Dedup/Compression Logic 144 further modified Block Metadata 316 for Block X 310 to include a pointer pointing back to Virtual Block Metadata 306. Block Metadata 316 for Block X 310 may, for example, be contained in or otherwise associated with Block X 310, and may contain various other metadata related to Block X 310.

In contrast, Block A 318 is an example of a block that has a contents on which data compression has not previously been performed. For example, data compression was not performed by In-Line Dedup/Compression Logic 144 on the portion of LUN-1 that corresponds to logical offset N, and the uncompressed data was stored by I/O Stack 140 into Block A 318. In order to map the file implementing LUN-1 to the uncompressed data in Block A 318 for the portion of LUN-1 corresponding to logical offset N, a pointer to Block A 318 was loaded into the block pointer in Block Pointers 304 corresponding to logical offset N. In the example of FIG. 3, no virtual block metadata was created for the uncompressed data stored in Block A 318. The Block Metadata 322 for Block A 318 is shown including a Version Family ID 319 indicating a version family for data object LUN-1 that contains the LUN data object LUN-1 and one or more snapshot data objects that are point in time copies of LUN-1. Each of the data objects in the version family for LUN-1 is implemented by a file that may be mapped to Block A 318, e.g. by a block pointer to Block A 318 corresponding to a logical offset of N. Block Metadata 322 for Block A 318 may, for example, be contained in or otherwise associated with Block A 318, and may contain various other metadata related to Block A 318.

The disclosed techniques may be embodied such that block metadata for individual blocks is used, e.g. by Background Data Operations Logic 174, to identify blocks within File System Address Space 202 having contents on which one or more background data operations have not previously been performed. For example, in one embodiment, and as shown by Block X 310 in FIG. 3, blocks that have contents on which compression has previously been performed, e.g. by In-Line Dedup/Compression Logic 144, contain or are otherwise associated with block metadata that points to virtual block metadata. In contrast, blocks having contents on which compression has not previously been performed, e.g. by In-Line Dedup/Compression Logic 144, and as shown by Block A 318 in FIG. 3, contain or are otherwise associated with block metadata that does not point to virtual block metadata. Specific indications of whether data encryption and/or data deduplication may also or alternatively be stored in the block metadata for each block, or the indication that the contents of a block has not previously been compressed may also serve as an indication that data deduplication and/or data encryption have also not previously been performed on the contents of the block.

As also shown in FIG. 3, the disclosed techniques may be embodied such that block metadata for individual blocks may also be used, e.g. by Background Data Operations Logic 174, to identify a family of data objects, each of which is implemented by a file that may be mapped to a block having contents on which one or more background data operations have not previously been performed (e.g. Block A 318). For example, in one embodiment, and as shown in FIG. 3, the block metadata for a block having contents on which one or more background data operations has not previously been performed (e.g. Block A 318) may contain a version family identifier (e.g. Version Family ID 319) indicating a version family of data objects that consists of a data object and one or more snapshot data objects that are point in time copies of that data object. Each data object in the version family is implemented by a file that may point to the block (e.g. to Block A 318). Accordingly, Background Data Operations Logic 174 may check each of the files that implements one of the data objects in the version family indicated by the block metadata for a block to find the set of files that are currently mapped to the block. For example, and as further described below, in order to identify the files that are currently mapped to Block A 318, the mapping structure for each file implementing a data object in the version family indicated by Version Family ID 319 (e.g. the version family of LUN-1) may be checked to determine whether a pointer corresponding to the logical offset indicated by Logical Offset 321 (e.g. logical offset N) points to Block A 318.

Figure 4:
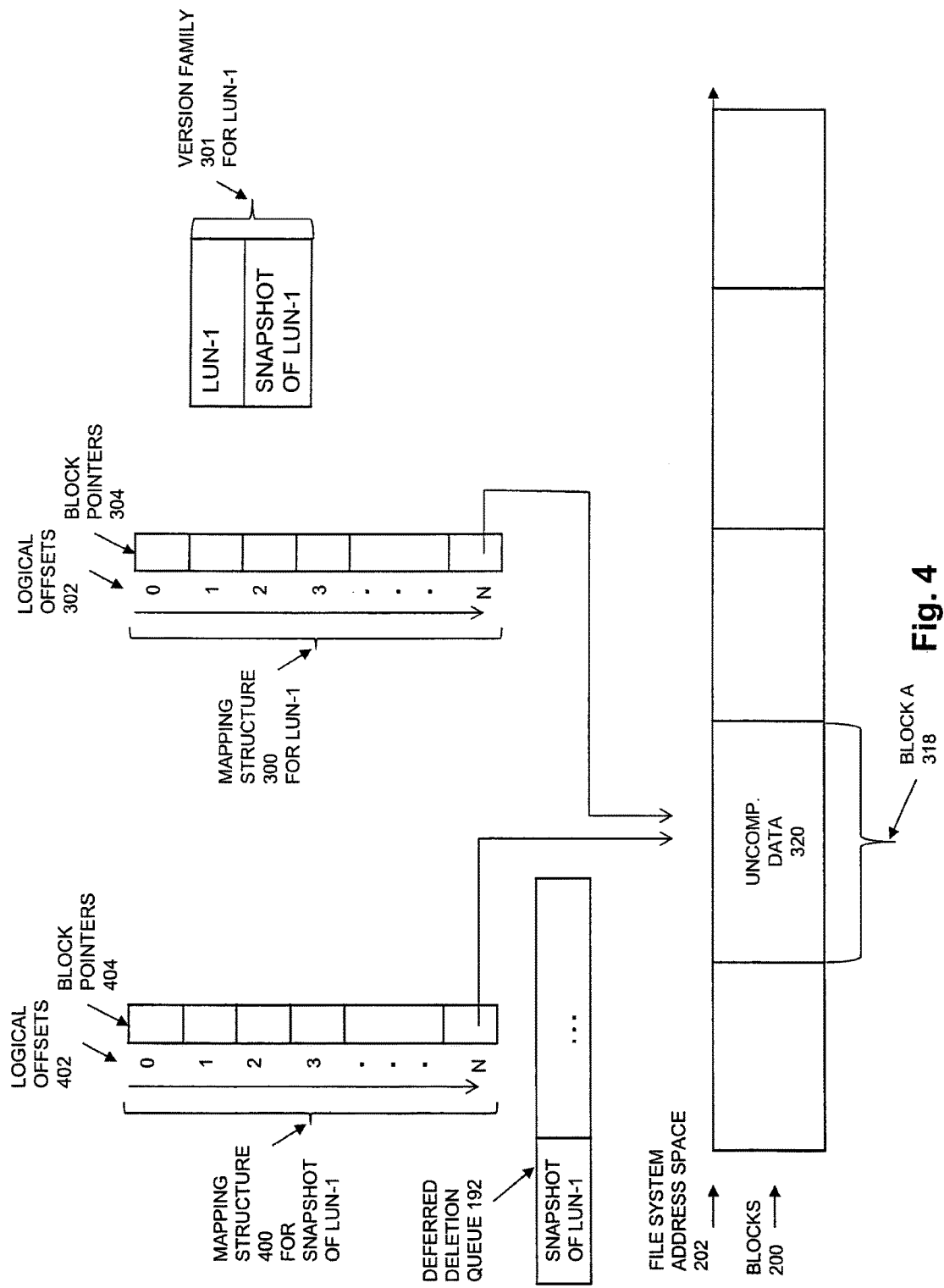
FIG. 4 is a block diagram showing a version family of data objects, each of which is implemented by a file that may be mapped to a block having contents on which a background data operation has not previously been performed, where the version family of data objects includes a LUN data object and a snapshot data object that is a copy of the LUN data object, and where the snapshot data object is scheduled for future deletion by having been previously queued to a deferred deletion queue.

FIG. 4 is a block diagram showing an example of a Version Family 301 for a data object LUN-1, where the Version Family 301 consists of the data object LUN-1 and a data object that is a snapshot of LUN-1. The Version Family 301 is an example of the version family indicated by the Version Family ID 319 in Block Metadata 322 for Block A 318, and accordingly each of the files implementing the data objects in Version Family 301 may be mapped to Block A 318. In order to determine whether the file implementing the LUN-1 data object is mapped to Block 1 318, Background Data Operations Logic 174 (Background Data Dedup/Compression Operations Logic 176 and/or Background Encryption Operations Logic 178) checks the block pointer in Block Pointers 304 in Mapping Structure 300 at the logical offset of N in Logical Offsets 302, as indicated by Logical Offset 321 in Block Metadata 322. In the example of FIG. 4, the block pointer in Block Pointers 304 for logical offset N points to Block A 318, and accordingly Background Data Operations Logic 174 finds that the file implementing the data object LUN-1 is currently mapped to Block A 318. In order to determine whether the file implementing the snapshot of LUN-1 is mapped to Block 1 318, Background Data Operations Logic 174 checks the block pointer in Block Pointers 404 in Mapping Structure 400 at logical offset N of Logical Offsets 402. In the example of FIG. 4, the block pointer in Block Pointers 404 for logical offset N of Logical Offsets 402 points to Block A 318, and accordingly Background Data Operations Logic 174 finds that the file implementing the snapshot of LUN-1 is also currently mapped to Block A 318. In this way Background Data Operations Logic 174 finds the set of files that are currently mapped to Block A 318 from the data objects in Version Family 301.

Background Data Operations Logic 174 also checks the Deferred Deletion Queue 192 to determine whether any of the data objects in Version Family 301 are contained in Deferred Deletion Queue 192, and accordingly are scheduled for future deletion. In the example of FIG. 4, Background Data Operations Logic 174 finds that only the snapshot of LUN-1 is contained in Deferred Deletion Queue 192, and accordingly determines that the snapshot of LUN-1 is scheduled for future deletion. In this way Background Data Operations Logic 174 determines that at least one of the files mapped to Block A 318 implements a data object that is scheduled for future deletion.

Figure 5:
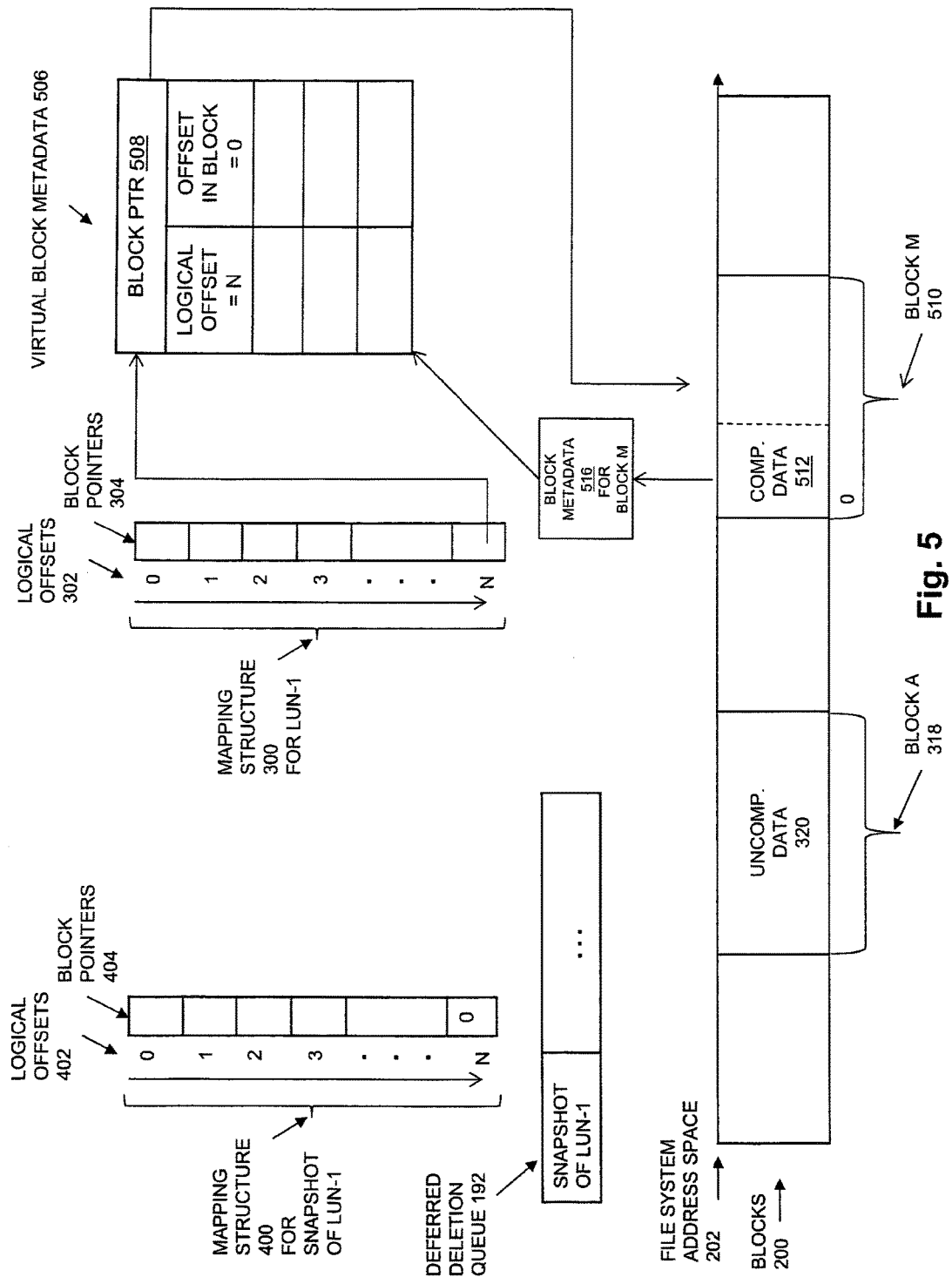
FIG. 5 is a block diagram further showing an example of how the version family of data objects in the example of FIG. 4 may be processed by the disclosed techniques, such that the background data operation is performed on the contents of the block on which the background data operation had not previously been performed and the block is freed from the file implementing the snapshot data object that is scheduled for future deletion.

FIG. 5 is a block diagram that shows an example of how the Version Family 301 of data objects shown in the example of FIG. 4 may be processed by the Background Data Operations Logic 174 (Background Data Dedup/Compression Operations Logic 176 and/or Background Data Dedup/Compression Operations Logic 178). For example, Background Data Dedup/Compression Operations Logic 176 may perform data compression on the Uncompressed Data 320 to generate Compressed Data 512, which is stored beginning at offset zero (0) in Block M 510. The block pointer in Block Pointers 304 corresponding to logical offset N of Logical Offsets 302 is modified to point to Virtual Block Metadata 506. Virtual Block Metadata 506 contains a Block Pointer 508 that points to Block M 510, and a mapping from logical offset N to an offset of zero (0) in Block M 510, indicating that the Compressed Data 512 for the portion of LUN-1 corresponding to offset N begins at offset zero into Block M 510. Block Metadata 516 is modified to point to point back to Virtual Block Metadata 506, providing an indication that Block M 510 contains compressed data.

Because the snapshot of LUN-1 has previously been queued to the Deferred Deletion Queue 192, and accordingly will no longer be accessed by Hosts 110(1-N), Background Data Dedup/Compression Operations Logic 176 does not modify the pointer in Block Pointers 404 corresponding to the logical offset of N in Logical Offsets 402 to point to Virtual Block Metadata 506. Instead, Background Data Dedup/Compression Operations Logic 176 frees Block A 318 from the file that implements the snapshot of LUN-1, for example removing the pointer to Block A 318 from the entry in Block Pointers 404 corresponding to the logical offset of N in Logical Offsets 402, and writing a zero to the entry in Block Pointers 404 corresponding to the logical offset of N in Logical Offsets 402.

Figure 6:
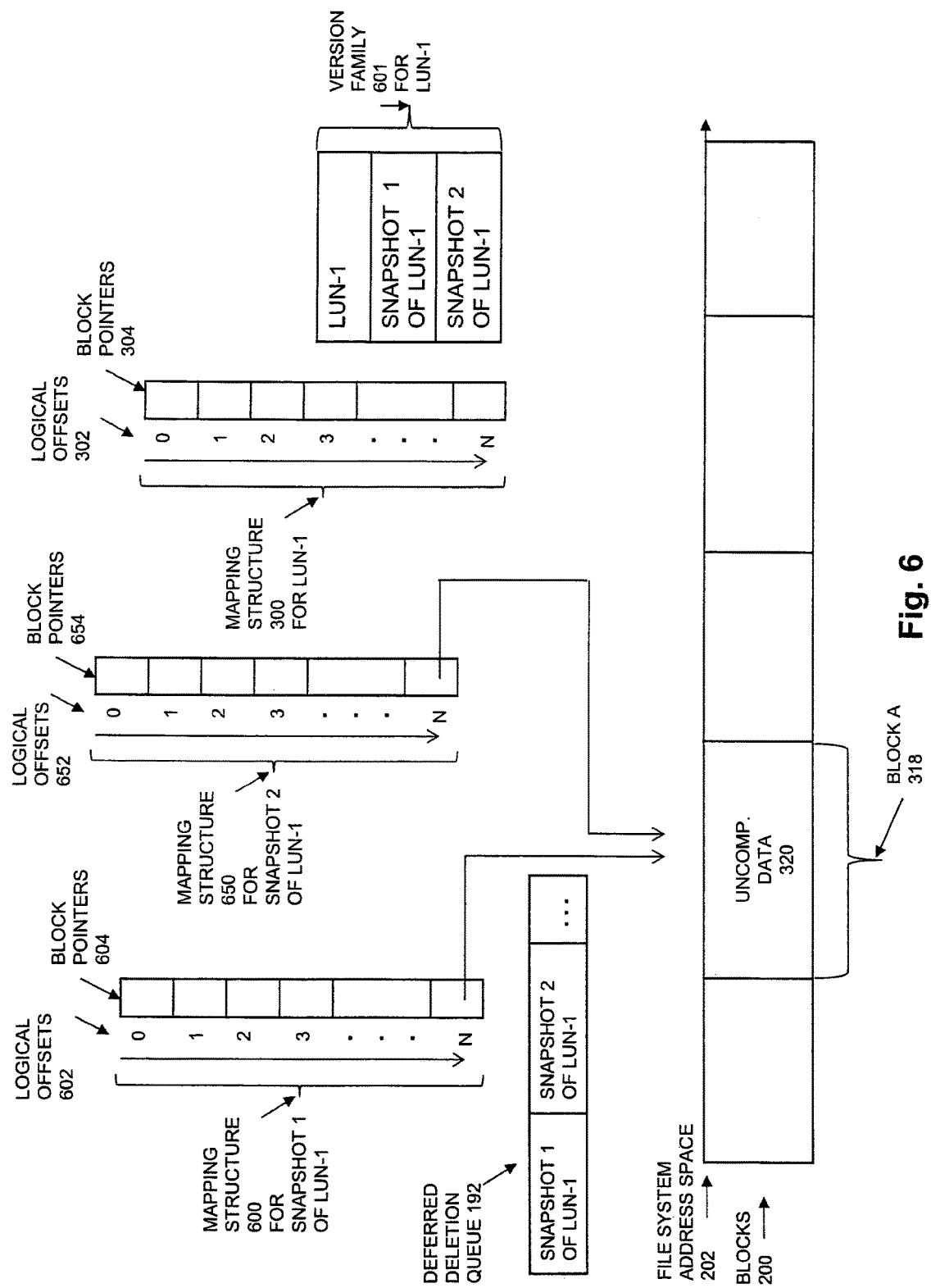
FIG. 6 is a block diagram showing a version family of data objects, each of which is implemented by a file that may be mapped to a block having contents on which a background data operation has not previously been performed, where the version family of data objects includes a LUN data object and two snapshot data objects that are point in time copies of the LUN data object, where the file implementing the LUN data object is no longer mapped to the block, and where the files implementing the snapshot data objects are both mapped to the block and both the snapshot data objects are scheduled for future deletion by having been previously queued to the deferred deletion queue.

FIG. 6 is a block diagram showing an example of a Version Family 601 for a data object LUN-1, where the Version Family 601 consists of the data object LUN-1 and two snapshot data objects that are snapshots of LUN-1, i.e. a snapshot 1 of LUN-1 and a snapshot 2 of LUN-1. The two snapshot data objects in Version Family 601 are point in time copies of LUN-1 taken at different points in time, e.g. snapshot 1 of LUN-1 is a point in time copy of LUN-1 taken at one time and snapshot 2 of LUN-1 is a point in time copy of LUN-1 taken at a subsequent, different time. Version Family 601 is another example of the version family indicated by the Version Family ID 319 in Block Metadata 322 for Block A 318, and accordingly in the example of FIG. 6 each of the files implementing the data objects in Version Family 601 may be mapped to Block A 318. Similarly as described above, in order to determine whether the file implementing the LUN-1 data object is currently mapped to Block 1 318, Background Data Operations Logic 174 (Background Data Dedup/Compression Operations Logic 176 and/or Background Data Encryption Operations Logic 178) checks the block pointer in Block Pointers 304 in Mapping Structure 300 at the logical offset of N in Logical Offsets 302, as indicated by Logical Offset 321 in Block Metadata 322. In the example of FIG. 6, the block pointer in Block Pointers 304 at logical offset N does not point to Block A 318, and accordingly Background Data Operations Logic 174 finds that the file implementing LUN-1 is not currently mapped to Block A 318. In order to determine whether the file implementing snapshot 1 of LUN-1 is mapped to Block 1 318, Background Data Operations Logic 174 checks the block pointer in Block Pointers 604 in Mapping Structure 600 at the logical offset of N in Logical Offsets 602. In the example of FIG. 6, the block pointer in Block Pointers 604 at logical offset N of Logical Offsets 602 points to Block A 318, and accordingly Background Data Operations Logic 174 finds that the file implementing snapshot 1 of LUN-1 is currently mapped to Block A 318.

In order to determine whether the file implementing snapshot 2 of LUN-1 is mapped to Block 1 318, Background Data Operations Logic 174 checks the block pointer in Block Pointers 654 in Mapping Structure 650 at the logical offset of N in Logical Offsets 652. In the example of FIG. 6, the block pointer in Block Pointers 654 at logical offset N of Logical Offsets 652 points to Block A 318, and accordingly Background Data Operations Logic 174 finds that the file implementing snapshot 2 of LUN-1 is also currently mapped to Block A 318. In this way Background Data Operations Logic 174 finds the set of files that are currently mapped to Block A 318 from the data objects in Version Family 601.

Background Data Operations Logic 174 also checks the Deferred Deletion Queue 192 to determine whether any of the data objects in Version Family 301 are contained in Deferred Deletion Queue 192, and accordingly are scheduled for future deletion. In the example of FIG. 6, Background Data Operations Logic 174 finds that both snapshot 1 of LUN-1 and snapshot 2 of LUN-1 are contained in Deferred Deletion Queue 192, and accordingly determines that both snapshot 1 of LUN-1 and snapshot 2 of LUN-1 are scheduled for future deletion, and will no longer be accessed by Hosts 110(1-N). In this way Background Data Operations Logic 174 determines that all of the files that are currently mapped to Block A 318 are scheduled for future deletion, and accordingly will no longer be accessed by Hosts 110(1-N).

Figure 7:
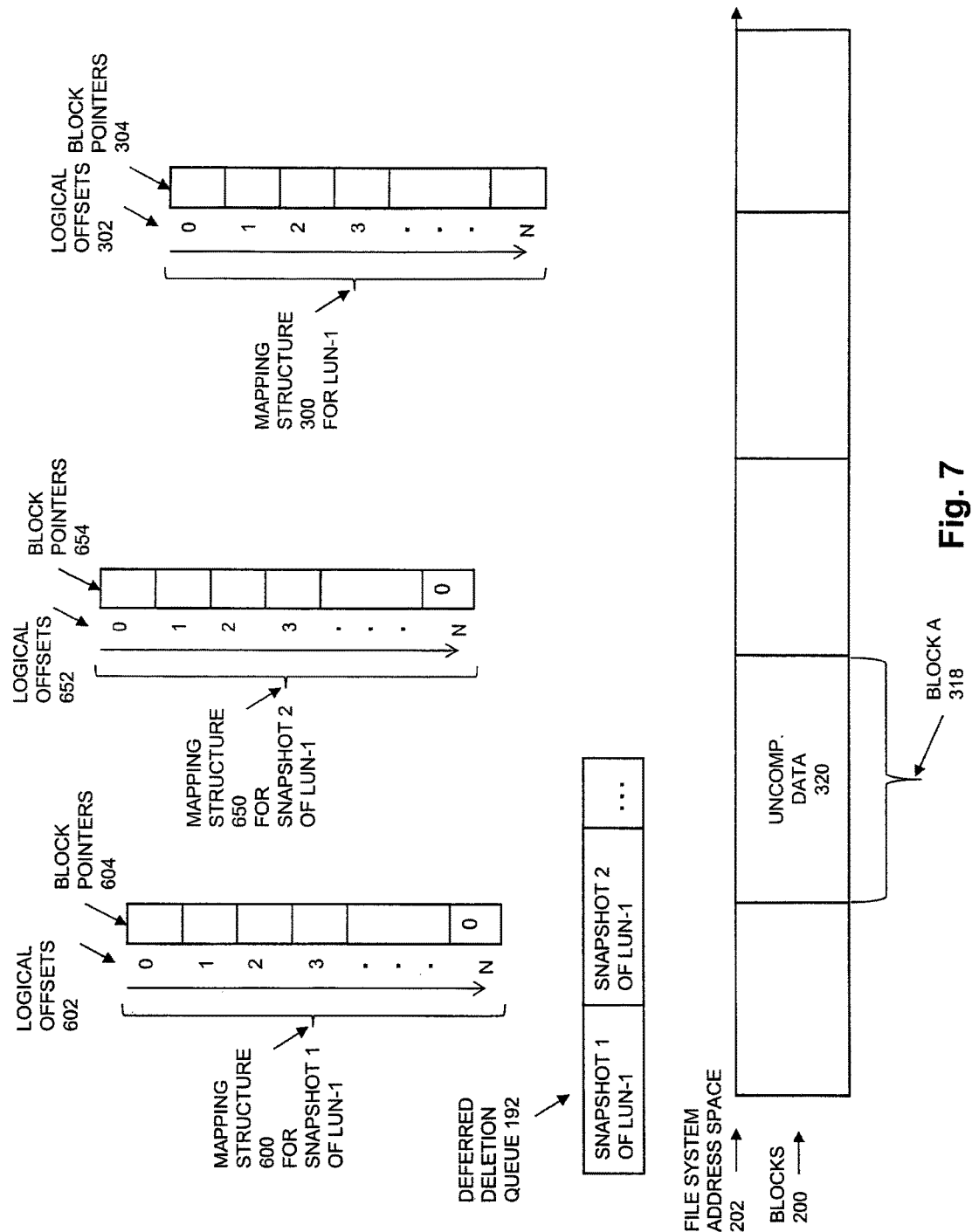
FIG. 7 is a block diagram is a block diagram further showing how the version family of data objects in FIG. 6 may be processed by the disclosed techniques, such that the background data operation is prevented from being performed on the contents of the block on which the background data operation had not previously been performed, and the block is freed from the files implementing the snapshot copy data objects that are scheduled for future deletion.

FIG. 7 is a block diagram that shows an example of how the Version Family 601 of data objects shown in the example of FIG. 6 may be processed by the Background Data Operations Logic 174 (Background Data Dedup/Compression Operations Logic 176 and/or Background Encryption Operations Logic 178). Background Data Operations Logic 174 determines that Block A 318 has contents that will no longer be accessed by Hosts 110(1-N), in response to determining that all of the files that are currently mapped to Block A 318 implement data objects that are scheduled for future deletion. Accordingly, Background Data Operations Logic 174 prevents any background data operations (e.g. data deduplication, data encryption, and/or data encryption) from being performed on the contents of Block A 318, in response to determining that Block A 318 has contents that will no longer be accessed by Hosts 110(1-N).

Because snapshot 1 of LUN-1 and snapshot 2 of LUN-1 have both previously been queued to the Deferred Deletion Queue 192, Background Data Dedup/Compression Operations Logic 176 also frees Block A 318 from the files that implement the two snapshots of LUN-1, for example by removing the pointer to Block A 318 from the entry in Block Pointers 604 corresponding to the logical offset of N in Logical Offsets 602, and writing a zero to the entry in Block Pointers 604 corresponding to the logical offset of N in Logical Offsets 602, and by removing the pointer to Block A 318 from the entry in Block Pointers 654 corresponding to the logical offset of N in Logical Offsets 652, and writing a zero to the entry in Block Pointers 654 corresponding to the logical offset of N in Logical Offsets 652.

Figure 8:
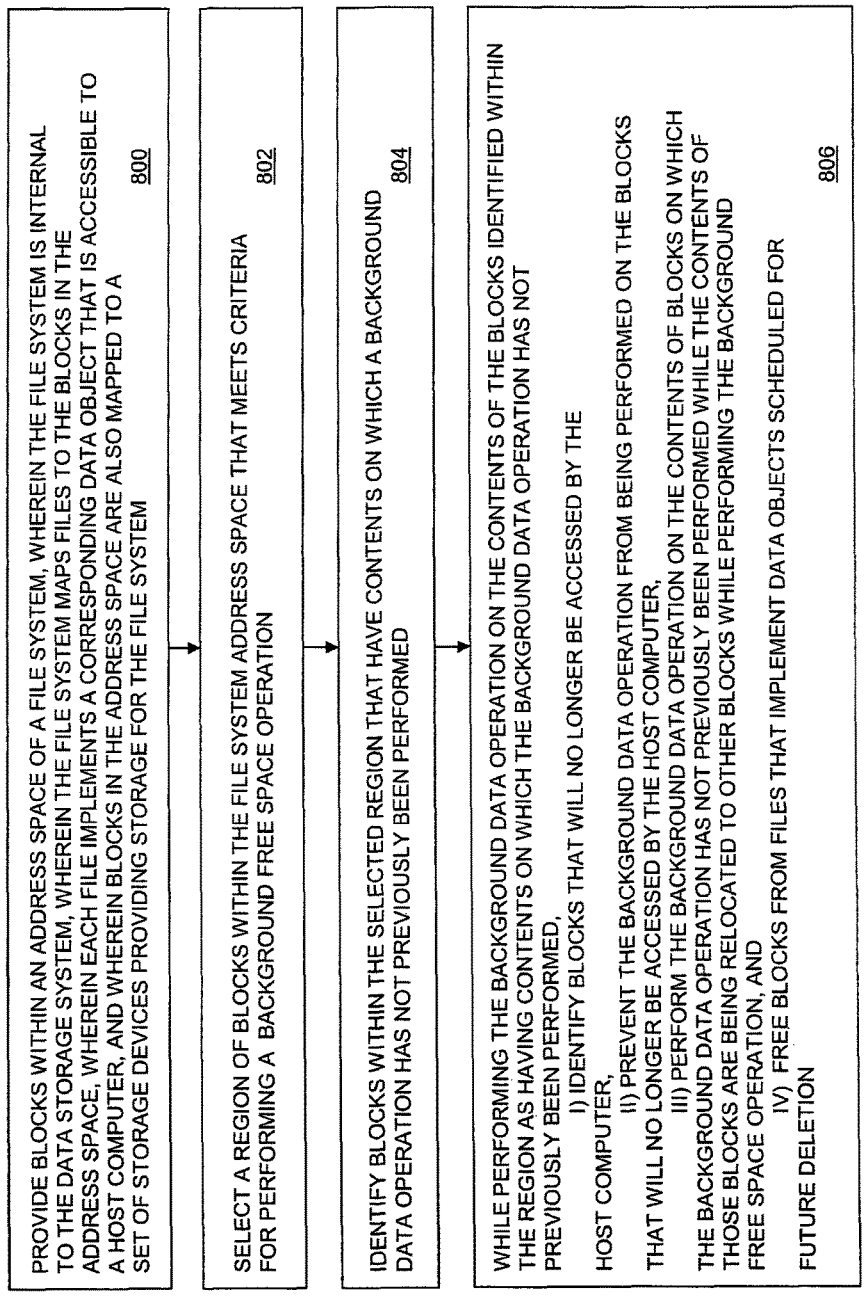
FIG. 8 is a flow chart showing an example of steps performed during operation of an embodiment of the disclosed techniques.

FIG. 8 is a flow chart showing an example of steps performed during operation of an embodiment of the disclosed techniques. The steps shown in FIG. 8 may, for example, be performed by the Background Operations Logic 172 and portions of the I/O Stack 140 shown in FIG. 1.

At step 800, blocks are provided within an address space (e.g. File System Address Space 202) of a file system that is internal to the data storage system (e.g. one of the file systems in Lower-Deck File Systems 150). The file system maps files to the blocks in the file system address space, and each file implements a corresponding data object that is accessible to at least one host computer (e.g. at least one of Hosts 110(1-N)). The blocks in the file system address space are also mapped to units of storage (e.g. slices) provisioned from a set of storage devices providing storage for the file system (e.g. Storage 180).

At step 802, a region of blocks (e.g. Region A 208 or Region B 210 in FIG. 2) is selected within the file system address space that meets criteria for performing a background free space operation, e.g. a criteria for performing a background free space operation such as a background free space defragmentation operation and/or a background space reclamation operation. Such criteria may, for example, include or be made up of having less than a threshold percentage or amount of allocated blocks within the region.

At step 804, blocks are identified within the selected region that have contents on which a background data operation has not previously been performed (e.g. on which data deduplication, data compression, and/or data encryption has not previously been performed). For example, the identification performed at step 804 may include or consist of examining block metadata contained in or otherwise associated with each block in the file system address space to find block metadata indicating that an associated block has contents on which a background data operation has not previously performed (e.g. Block Metadata 322 in FIG. 3).

At step 806, while performing the background data operation (e.g. data deduplication, data compression, and/or data encryption) on the contents of the blocks identified within the region as having contents on which the data operation has not previously been performed, i) blocks are identified that will no longer be accessed by the host computer (e.g. blocks that are mapped to only by files that implement data objects that are scheduled for future deletion), ii) the background data operation is prevented from being performed on the blocks that will no longer be accessed by the host computer (e.g. Block A 318 in the example of FIGS. 6&7), iii) the background data operation is performed on the contents of blocks on which the background data operation has not previously been performed (e.g. Block A 318 in the example of FIGS. 4&5) while the contents of those blocks are being relocated to other blocks while performing the background free space operation (e.g. a background free space defragmentation operation and/or a background space reclamation operation), and iv) blocks are freed from files that implement data objects scheduled for future deletion while performing the background data operation (e.g. Block A 318 is freed from Mapping Structure 400 in the example of FIGS. 4&5 and is freed from Mapping Structures 600 and 650 in the example of FIGS. 6&7).

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art will readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of aggregating background processing performed in a data storage system, comprising the steps of:

providing blocks within an address space of a file system, wherein the file system is internal to the data storage system, wherein the file system maps files to the blocks in the address space, wherein each file implements a corresponding data object that is accessible to at least one host computer, and wherein blocks in the address space also correspond to non-volatile storage provisioned from a set of storage devices that provide storage for the file system;

identifying blocks within the address space having contents on which a background data operation has not previously been performed; and while performing the background data operation on the contents of the blocks identified within the address space as having contents on which the background data operation has not previously been performed, i) identifying blocks having contents on which the background data operation has not previously been performed and that will no longer be accessed by the host computer, and ii) preventing the background data operation from being performed on blocks having contents on which the data operation has not previously been performed and that will no longer be accessed by the host computer.

2. The method of claim 1, further comprising:

selecting a region of blocks within the address space that meets criteria for performing a background free space operation;

wherein identifying blocks within the address space having contents on which the background data operation has not previously been performed is performed within the selected region; and wherein performing the background data operation on the contents of blocks identified within the selected region as having contents on which the background data operation has not previously been performed is performed while the contents of the blocks identified within the selected region as having contents on which the background data operation has not previously been performed are being relocated as part of performing the background free space operation.

3. The method of claim 2, wherein meeting the criteria for performing the background free space operation comprises having less than a threshold percentage of allocated blocks; and wherein selecting the region of blocks within the address space that meets the criteria for performing the background free space operation comprises selecting a region of blocks having less than a threshold percentage of allocated blocks and corresponding to a slice of non-volatile storage that is provisioned from the set of storage devices and that is used as non-volatile storage for the contents of the blocks in the region.

4. The method of claim 1, wherein identifying blocks having contents on which the background data operation has not previously been performed and that will no longer be accessed by the host computer includes:
for each block having contents on which the background data operation has not previously been performed, i) finding a set of one or more files that are mapped to the block, and ii) identifying the block as having contents on which the background data operation has not previously been performed and that will no longer be accessed by the host in response to determining that all files mapped to the block implement data objects that are scheduled for future deletion.

5. The method of claim 1, wherein performing the data operation on the contents of blocks identified within the address space as having contents on which the background data operation has not previously been performed includes, further performing the following steps for each identified block:
finding a set of one or more files that are mapped to the block;
determining that at least one of the files mapped to the block implements a data object that is scheduled for future deletion; and
freeing the block from the file mapped to the block that implements the data object that is scheduled for future deletion, such that the file that implements the data object that is scheduled for further deletion is no longer mapped to the block.

6. The method of claim 1, wherein the background data operation comprises data deduplication; and
wherein performing the background data operation on the contents of blocks identified within the address space as having contents on which the background data operation has not previously been performed includes performing data deduplication on the contents of blocks identified within the address space as having contents on which data deduplication has not previously been performed.

7. The method of claim 1, wherein the background data operation comprises data compression; and
wherein performing the background data operation on the contents of blocks identified within the address space as having contents on which the background data operation has not previously been performed includes performing data compression on the contents of blocks identified within the address space as having contents on which data compression has not previously been performed.

8. The method of claim 1, wherein the background data operation comprises data encryption; and
wherein performing the background data operation on the contents of blocks identified within the address space as having contents on which the background data operation has not previously been performed includes performing data encryption on the contents of blocks identified within the address space as having contents on which data encryption has not previously been performed.

9. The method of claim 2, wherein the background free space operation comprises free space defragmentation; and
wherein performing the data operation on the contents of blocks identified within the selected region as having contents on which the background data operation has not previously been performed is performed while the contents of the blocks identified within the selected region as having contents on which the background data operation has not previously been performed are being relocated as part of performing free space defragmentation.

10. A computerized apparatus, comprising a set of processing units and memory, coupled to the set of processing units, the memory storing instructions for aggregating background processing which, when executed by the set of processing units, cause the set of processing units to:
provide blocks within an address space of a file system, wherein the file system is internal to the data storage system, wherein the file system maps files to the blocks in the address space, wherein each file implements a corresponding data object that is accessible to at least one host computer, and wherein blocks in the address space also correspond to non-volatile storage provisioned from a set of storage devices that provide storage for the file system;
identify blocks within the address space having contents on which a background data operation has not previously been performed; and
while performing the background data operation on the contents of the blocks identified within the address space as having contents on which the background data operation has not previously been performed, i) identify blocks having contents on which the background data operation has not previously been performed and that will no longer be accessed by the host computer, and ii) prevent the background data operation from being performed on blocks having contents on which the data operation has not previously been performed and that will no longer be accessed by the host computer.

11. The computerized apparatus of claim 10, wherein the instructions for aggregating background processing, when executed by the set of processing units, further cause the set of processing units to:
select a region of blocks within the address space that meets criteria for performing a background free space operation;
identify blocks within the address space having contents on which the background data operation has not previously been performed by identifying blocks on which the background data operation has not previously been performed within the selected region; and
wherein the background data operation is performed on the contents of blocks identified within the selected region as having contents on which the background data operation has not previously been performed while the contents of the blocks identified within the selected region as having contents on which the background data operation has not previously been performed are being relocated as part of performing the background free space operation.

12. The computerized apparatus of claim 11, wherein meeting the criteria for performing the background free space operation comprises having less than a threshold percentage of allocated blocks; and
wherein the region of blocks is selected within the address space that meets the criteria for performing the background free space operation by selecting a region of blocks having less than a threshold percentage of allocated blocks and corresponding to a slice of non-volatile storage that is provisioned from the set of storage devices and that is used as non-volatile storage for the contents of the blocks in the region.

13. The computerized apparatus of claim 10, wherein the blocks identified as having contents on which the background data operation has not previously been performed and that will no longer be accessed by the host computer are identified by:
   for each block having contents on which the background data operation has not previously been performed, i) finding a set of one or more files that are mapped to the block, and ii) identifying the block as having contents on which the background data operation has not previously been performed and that will no longer be accessed by the host in response to determining that all files mapped to the block implement data objects that are scheduled for future deletion.

14. The computerized apparatus of claim 10, wherein the data operation is performed on the contents of blocks identified within the address space as having contents on which the background data operation has not previously been performed at least in part by, for each identified block:
   finding a set of one or more files that are mapped to the block;
   determining that at least one of the files mapped to the block implements a data object that is scheduled for future deletion; and
   freeing the block from the file mapped to the block that implements the data object that is scheduled for future deletion, such that the file that implements the data object that is scheduled for further deletion is no longer mapped to the block.

15. The computerized apparatus of claim 10, wherein the background data operation comprises data deduplication; and
   wherein the background data operation is performed on the contents of blocks identified within the address space as having contents on which the background data operation has not previously been performed at least in part by performing data deduplication on the contents of blocks identified within the address space as having contents on which data deduplication has not previously been performed.

16. The computerized apparatus of claim 10, wherein the background data operation comprises data compression; and
   wherein the background data operation is performed on the contents of blocks identified within the address space as having contents on which the background data operation has not previously been performed at least in part by performing data compression on the contents of blocks identified within the address space as having contents on which data compression has not previously been performed.

17. The computerized apparatus of claim 10, wherein the background data operation comprises data encryption; and
   wherein the background data operation is performed on the contents of blocks identified within the address space as having contents on which the background data operation has not previously been performed at least in part by performing data encryption on the contents of blocks identified within the address space as having contents on which data encryption has not previously been performed.

18. The method of claim 11, wherein the background free space operation comprises free space defragmentation; and
   wherein the data operation performed on the contents of blocks identified within the selected region as having contents on which the background data operation has not previously been performed is performed while the contents of the blocks identified within the selected region as having contents on which the background data operation has not previously been performed are being relocated as part of performing free space defragmentation.

19. A non-transitory, computer-readable medium including instructions which, when executed by a set of processing units of a computerized apparatus, cause the set of processing units to perform a method for aggregating background processing performed in a data storage system, the method comprising the steps of:
   providing blocks within an address space of a file system, wherein the file system is internal to the data storage system, wherein the file system maps files to the blocks in the address space, wherein each file implements a corresponding data object that is accessible to at least one host computer, and wherein blocks in the address space also correspond to non-volatile storage provisioned from a set of storage devices that provide storage for the file system;
   identifying blocks within the address space having contents on which a background data operation has not previously been performed; and
   while performing the background data operation on the contents of the blocks identified within the address space as having contents on which the background data operation has not previously been performed, i) identifying blocks having contents on which the background data operation has not previously been performed and that will no longer be accessed by the host computer, and ii) preventing the background data operation from being performed on blocks having contents on which the data operation has not previously been performed and that will no longer be accessed by the host computer.

* * * * *